US009098494B2

(12) United States Patent
Sarikaya et al.

(10) Patent No.: US 9,098,494 B2
(45) Date of Patent: Aug. 4, 2015

(54) BUILDING MULTI-LANGUAGE PROCESSES FROM EXISTING SINGLE-LANGUAGE PROCESSES

(75) Inventors: Ruhi Sarikaya, Redmond, WA (US); Daniel Boies, Saint-Lambert (CA); Fethiye Asli Celikyilmaz, Mountain View, CA (US); Anoop K. Deoras, San Jose, CA (US); Dustin Rigg Hillard, Seattle, WA (US); Dilek Z. Hakkani-Tur, Los Altos, CA (US); Gokhan Tur, Los Altos, CA (US); Fileno A. Alleva, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 13/469,078

(22) Filed: May 10, 2012

(65) Prior Publication Data

US 2013/0304451 A1 Nov. 14, 2013

(51) Int. Cl.
*G06F 17/28* (2006.01)
*G06F 17/27* (2006.01)
(Continued)

(52) U.S. Cl.
CPC .................................. *G06F 17/289* (2013.01)

(58) Field of Classification Search
CPC ..... G06F 17/28; G06F 17/2785; G06F 17/21; G06F 17/2735; G06F 17/2854; G06F 17/289; G06F 17/2809; G06F 17/2223; G06F 17/2705; G06F 17/2775; G06F 17/2795; G06F 17/2863; G06F 17/2872; G06F 17/3043; G06F 17/30796; G10L 21/00; G10L 17/22; G10L 15/193; H04N 21/440236; H04M 2201/39
USPC ............... 704/2, 3, 4, 5, 9, 10, 235, 246, 270, 704/270.1, 275, 277
See application file for complete search history.

(56) References Cited

U.S. PATENT DOCUMENTS 5,220,503 A * 6/1993 Suzuki et al. ..................... 704/2
5,477,451 A * 12/1995 Brown et al. ..................... 704/9

(Continued)

FOREIGN PATENT DOCUMENTS

EP 2571023 A1 3/2013

OTHER PUBLICATIONS

Schultz, et al., "Language Independent and Language Adaptive Acoustic Modeling for Speech Recognition", Retrieved at <<http://citeseerx.ist.psu.edu/viewdoc/download?doi=10.1.1.9.8233 &rep=rep1&type=pdf>>, Speech Communication, vol. 35, No. 1-2, Aug. 2001, pp. 1-20.

(Continued)

*Primary Examiner* — Edgar Guerra-Erazo
(74) *Attorney, Agent, or Firm* — Steven Spellman; Danielle Johnston-Holmes; Micky Minhas

(57) ABSTRACT

Processes capable of accepting linguistic input in one or more languages are generated by re-using existing linguistic components associated with a different anchor language, together with machine translation components that translate between the anchor language and the one or more languages. Linguistic input is directed to machine translation components that translate such input from its language into the anchor language. Those existing linguistic components are then utilized to initiate responsive processing and generate output. Optionally, the output is directed through the machine translation components. A language identifier can initially receive linguistic input and identify the language within which such linguistic input is provided to select an appropriate machine translation component. A hybrid process, comprising machine translation components and linguistic components associated with the anchor language, can also serve as an initiating construct from which a single language process is created over time.

24 Claims, 6 Drawing Sheets

(51) Int. Cl.
*G10L 15/00* (2013.01)
*G10L 17/00* (2013.01)

(56) References Cited

U.S. PATENT DOCUMENTS

| | | | |
|---|---|---|---|
| 5,768,603 A * | 6/1998 | Brown et al. | 704/9 |
| 6,085,160 A | 7/2000 | D'hoore et al. | |
| 6,789,057 B1 * | 9/2004 | Morimoto et al. | 704/2 |
| 6,789,093 B2 * | 9/2004 | Obuchi et al. | 1/1 |
| 7,043,431 B2 | 5/2006 | Riis et al. | |
| 7,467,085 B2 * | 12/2008 | Obuchi et al. | 704/246 |
| 7,925,493 B2 * | 4/2011 | Watanabe et al. | 704/2 |
| 7,949,517 B2 | 5/2011 | Eckert et al. | |
| 8,055,495 B2 * | 11/2011 | Sumita | 704/2 |
| 8,090,570 B2 * | 1/2012 | Waibel et al. | 704/2 |
| 8,249,854 B2 * | 8/2012 | Nikitin et al. | 704/2 |
| 8,554,558 B2 * | 10/2013 | McCarley et al. | 704/235 |
| 2005/0033582 A1 | 2/2005 | Gadd et al. | |
| 2008/0235027 A1 | 9/2008 | Cross | |
| 2009/0132235 A1 * | 5/2009 | Liu | 704/4 |
| 2009/0281789 A1 * | 11/2009 | Waibel et al. | 704/3 |
| 2010/0088085 A1 * | 4/2010 | Jeon et al. | 704/7 |
| 2010/0131262 A1 | 5/2010 | Gruhn et al. | |
| 2010/0174523 A1 | 7/2010 | Jang et al. | |

OTHER PUBLICATIONS

Fugen, et al., "Efficient Handling of Multilingual Language Models", Retrieved at <<http://ieeexplore.ieee.org/stamp/stamp.jsp?tp=&arnumber=1318481>>, IEEE Workshop on Automatic Speech Recognition and Understanding, ASRU, Nov. 30, 2003, pp. 441-446.

"International Search Report & Written Opinion for PCT Patent Application No. PCT/US2013/038966", Mailed Date: Jan. 15, 2014, Filed Date: May 1, 2013, 10 Pages.

Jabaian, et al., "Investigating Multiple Approaches for SLU Portability to a New Language", In Proceedings of the 11th Annual Conference of the International Speech Communication Association, Sep. 26, 2010, pp. 2502-2505.

Waibel, et al., "Spoken Language Translation", In IEEE Signal Processing Magazine, vol. 25, Issue 3, May, 2008, pp. 70-79.

He, et al., "Multi-Style Adaptive Training for Robust Cross-Lingual Spoken Language Understanding", In IEEE International Conference on Acoustics, Speech and Signal Processing, May 26, 2013, pp. 8342-8346.

* cited by examiner

US 9,098,494 B2

BUILDING MULTI-LANGUAGE PROCESSES FROM EXISTING SINGLE-LANGUAGE PROCESSES

BACKGROUND

Traditionally, users of computing devices have been forced to provide input to processes executing on those computing devices in the manner specified by those processes. Thus, for example, to perform calculations in a spreadsheet application program executing on a computing device, a user is forced to enter the values and the formulas that the user desires to have calculated in the manner specified by the spreadsheet application program. As another example, to select a different font in a word processing application program executing on a computing device, a user is forced to select typographic information via the mechanisms provided by the word processing application. While such mechanisms may become second nature to users that continually interact with such application programs executing on computing devices, they are, nevertheless, different from the manner in which users traditionally communicate with one another.

As the processing capabilities of computing devices have increased, a greater number of application programs executing on those computing devices have been designed to accept input that is more naturally provided by users. For example, one increasingly common input mechanism is for a user to speak, or otherwise linguistically enter, what they seek to have an application program perform, and the application program can then interpret such linguistic input and respond accordingly. By providing application programs with the capability to respond to linguistic input, the programmers of such application programs are providing application programs that are easier for users to learn and utilize.

Unfortunately, linguistic input is dependent upon the language being spoken by the user. Thus, an application program that was designed to accept linguistic input provided in one language will not be able to understand linguistic input provided in another, different language. Due to the variety of languages spoken by users around the world, and due to the substantial linguistic differences between them, developers of application programs that desire to have their application programs accept linguistic input are forced to create different versions of those application programs for each of the different languages that such application programs will support.

More significantly, the process of creating an application program that can accept linguistic input can be time-consuming and expensive. For example, substantial time and resource investment can be directed towards training a language understanding component of such an application program to be able to accurately decipher a user's intent from the linguistic input provided by the user. And it is precisely such a language understanding component that must, then, be re-created for each language that an application developer desires their application program to support.

SUMMARY

In one embodiment, the linguistic components of an existing application program, which operate in an anchor language, and which represent a substantial investment of time and resources, can be reused to create application programs capable of accepting linguistic input in languages other than such an anchor language. Machine translation technologies, which provide for the translation, by a computing device, of input received in one language into that of another, different language, can be coupled with such linguistic components of an existing application program to reuse those linguistic components, while enabling the acceptance of input in languages other than the anchor language.

In another embodiment, multiple machine translation components, representing the capability to translate between multiple languages and an anchor language of existing linguistic components, can be packaged into a single application program, thereby providing such an application program the capability to receive linguistic input in a variety of different languages. A language identification component can initially receive linguistic input, and can identify therefrom the language in which such linguistic input is being provided. An appropriate machine translation component can then be selected based upon such a language identification.

In a further embodiment, a hybrid application, comprising existing linguistic components associated with an anchor language and machine translation components for translating between other languages and such an anchor language, can act as a starting point from which to develop linguistic components associated with a native language, thereby obviating the need for machine translation components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
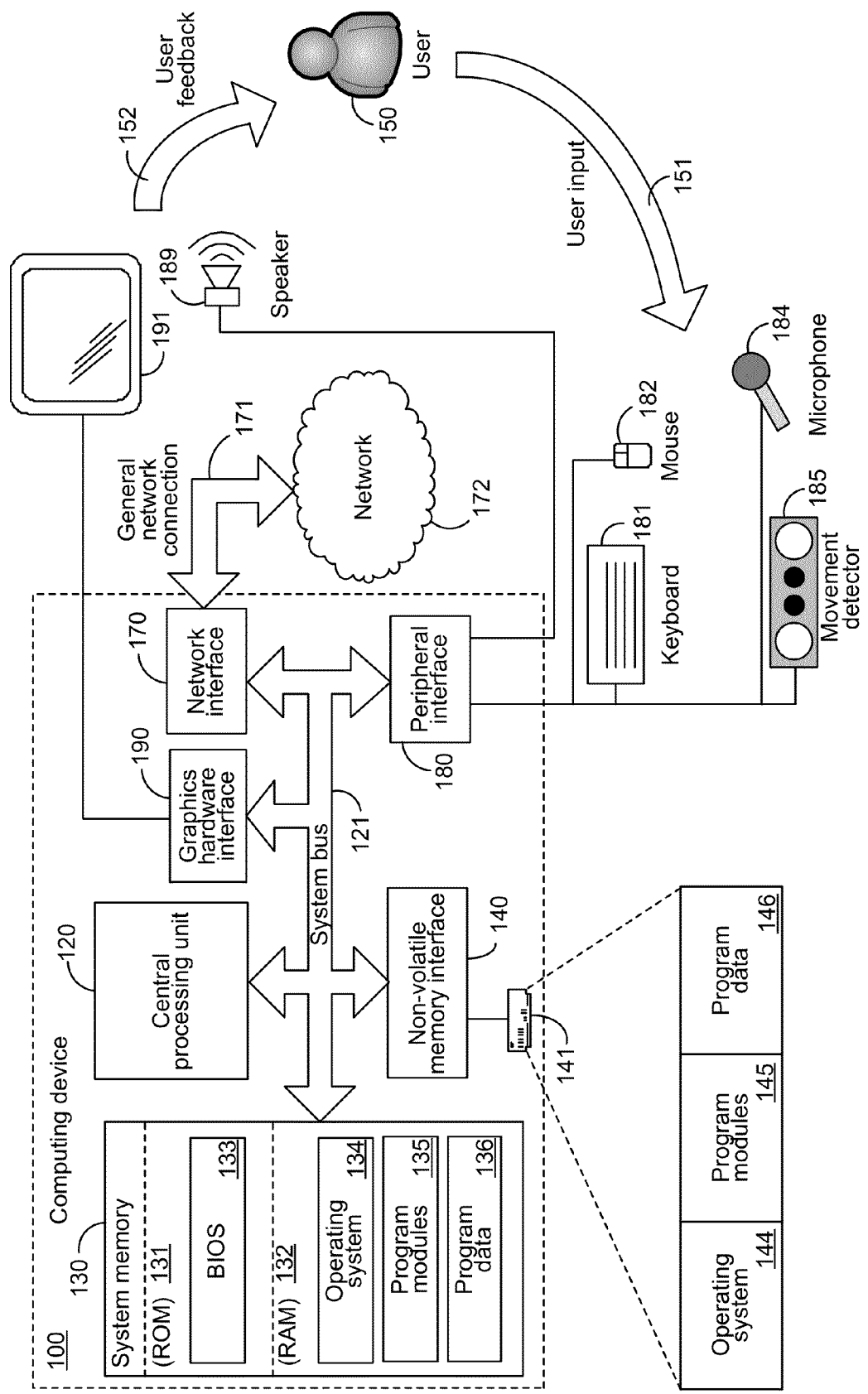
FIG. 1 is a block diagram of an exemplary computing device capable of receiving linguistic input.

The following description relates to the efficient generation of processes capable of accepting linguistic input in one or more languages by re-using existing linguistic components associated with a different, anchor language, together with machine translation components that can translate between the anchor language and the one or more other languages. Linguistic input can be directed to a machine translation component that can translate such input from whatever language it was provided in into an anchor language with which existing linguistic components are associated. Those existing linguistic components can then be utilized to initiate processing responsive to the linguistic input and generate an appropriate output. Optionally, the output can be directed to the machine translation component to be translated back into the same language in which the input was received, for presentation to the user. Multiple machine translation components can be utilized to accept linguistic input from multiple different languages, and a language identification component can initially receive such linguistic input and can identify the language within which such linguistic input is provided and, thereby, select an appropriate machine translation component. A hybrid process, comprising machine translation components and linguistic components associated with an anchor language, can also serve as an initiating construct from which a single language process can be created over time.

The techniques described herein focus on linguistic input, such as spoken input. However, while such illustrations and descriptions are made for ease of reference, the techniques described herein are not so limited. In particular, the techniques described are equally applicable to any sort of input that is language-based. Therefore, the following illustrations and descriptions are meant to be illustrative only and are not meant to limit the below-described techniques to the specific linguistic inputs described.

Although not required, the description below will be in the general context of instructions being executed by a device having computational abilities. Such computing devices include both traditional computers and consumer-electronic devices having computational abilities, such as those provided by a central processing unit. Thus, the description below will be in the general context of computer-executable instructions, such as program modules, that are capable of being executed by such a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers and conventional personal electronics devices, and can include other devices capable of computation, including hand-held devices, multi-processor systems, other microprocessor based or programmable consumer electronics, network PCs, minicomputers, mainframe computers, and the like. Similarly, the computing devices need not be limited to a stand-alone device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated, which can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can include peripherals that can enable a user 150 to interact with the computing device. Such peripherals can include peripherals for presenting information from the computing device 100 to the user 150, such as the user feedback 152, and can include peripherals for enabling the user 150 to provide information and instruction to the computing device 100, such as the user input 151. Peripherals that can enable the computing device 100 to present information to a user can comprise graphics hardware, including, but not limited to, a graphics hardware interface 190 and a display device 191 that can be utilized, by the computing device, to present visual, graphical user interfaces to the user. Additional peripherals that can enable the computing device 100 to present information to a user can also include one or more speakers 189, which can provide auditory information from the computing device 100 to a user of that computing device, as well as other like peripheral devices that are not explicitly shown in FIG. 1. Such peripherals can be communicationally coupled to the computing device 100 via a peripheral interface 180 that is connected to the system bus 121. Peripherals that can enable a user to provide information to the computing device 100 can include a mouse 182, a keyboard 181, a microphone 184, a movement detector 185 or other devices not explicitly illustrated in FIG. 1, such as trackpads, accessory tablets, multi-touch input devices and the like. The above-described peripheral devices can be communicationally coupled to the system bus 121 of the computing device 100 via the peripheral interface 180 and often include both hardware aspects and software aspects to enable their functionality. As such, while only their hardware representations are shown in FIG. 1, reference to such peripherals below is meant to include both the hardware and software aspects utilized for proper operation of such peripherals.

The computing device 100 also typically includes computer readable media, which can include any available media that can be accessed by computing device 100 and includes both volatile and nonvolatile media and removable and non-removable media. By way of example, and not limitation, computer readable media may comprise computer storage media, communication media or combinations thereof. Computer storage media includes media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through an interface such as non-volatile memory interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is not limited to any particular network or networking protocols. Thus, for simplicity of illustration, the computing device 100 is shown in FIG. 1 to be connected to a network 172 via a general network connection 171 that can be a local area network (LAN), a wide area network (WAN) or other networks. The computing device 100 is connected to the general network connection 171 through a network interface or adapter 170, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
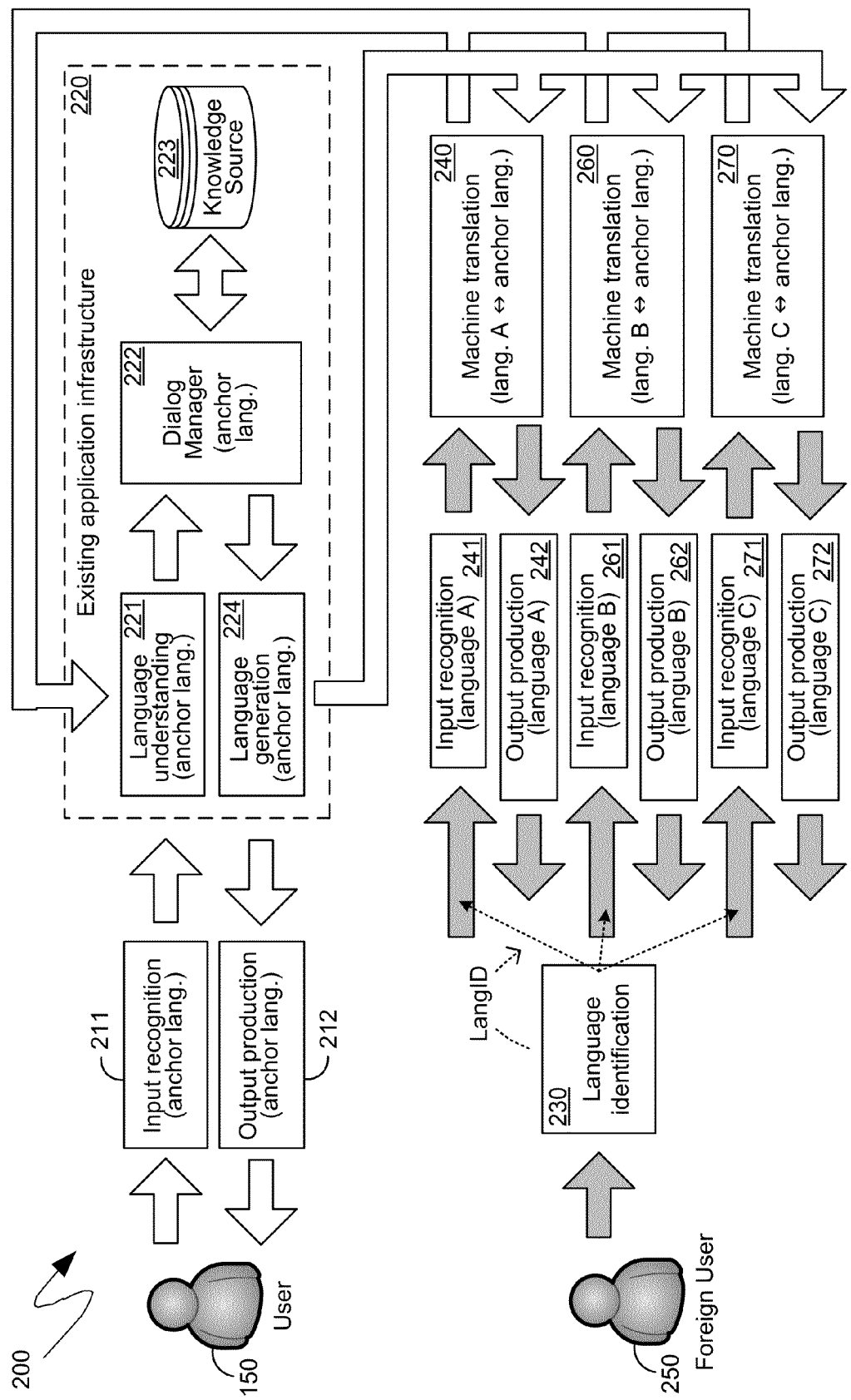
FIG. 2 is a block diagram of an exemplary hybrid process comprising linguistic components associated with an anchor language and machine translation components for translating between the anchor language and other languages.

Turning to FIG. 2, the system 200 shown therein illustrates an exemplary process that can reuse existing infrastructure to efficiently provide linguistic understanding capabilities in one or more languages that differ from the language within which the existing infrastructure was created. In one embodiment, an existing application or process executing on a computing device, such as the exemplary computing device 100, can be capable of accepting linguistic input, and, optionally, generating linguistic output in an anchor language in which that application or process was created. As utilized herein, the term "linguistic input" means input in any form that comprises words or phrases in the manner they would be utilized for inter-human communication. For example, an application executing on a home entertainment computing device can have been programmed to accept, understand and respond to spoken commands in English to enable a user to search for and select entertainment content to be presented by such a home entertainment computing device. As another example, an application executing on a smartphone computing device can have been programmed to accept, understand and respond to spoken inputs in English that comprise questions asked by a user. While, typically, "linguistic input" will be provided by a user in spoken form, the term "linguistic input" as utilized and defined herein is not so limited. Indeed, the mechanisms described herein are equally applicable to "linguistic input" provided in the form of text, gestures, gazes, sign language, and other like mechanisms by which "linguistic input", as defined herein, can be provided to a computing device.

Such an application or process can comprise an existing application infrastructure 220, such as that illustrated in FIG. 2, which can represent the computer-executable instructions responsible for understanding and acting upon linguistic input provided in the anchor language. As will be recognized by those skilled in the art, the components and processes contained within the existing application infrastructure 220 can represent a substantial investment of time and resources. Furthermore, such infrastructure is unique to the language within which it was created. For example, if the existing application infrastructure 220 is part of an application designed to accept and act upon linguistic input provided in English, then such infrastructure will not be capable of acting upon input provided in another language, such a French. Consequently, if the developer of an application or process that comprises the existing application infrastructure 220 seeks to release, for example, a French version of such an application or process, that developer will need to again invest a substantial amount of time and resources into a French-oriented version of the existing application infrastructure 220. For applications or processes that are to be utilized worldwide, such single-language limitations can result in the repetition of the creation, from scratch, of single-language application infrastructures for a myriad of languages. To avoid such a substantial investment of time and resources, the existing application infrastructure 220 can be re-utilized with the aid of machine translation components. More specifically, and as will be described in detail below, machine translation components can translate input and, optionally, output from a native language of a user of an application or a process into the anchor language of the existing application infrastructure 220, thereby enabling the existing application infrastructure 220 to provide linguistic services to applications or processes operating in native languages that differ from the anchor language. By re-using the existing application infrastructure 220, a developer of an application or process can generate equivalent versions in other languages without investing the substantial time and resources typically required to recreate analogous versions of the existing application infrastructure 220 in those other languages. For clarity and ease of reference, the term "anchor language" is utilized herein to mean the language within which an initial linguistic infrastructure was created, which initial linguistic infrastructure will be re-used. The term "native language" is utilized herein to mean the language within which input will be provided to an application or process and the language within which any output from the application or process is expected to be provided.

The system 200 shown in FIG. 2 illustrates the existing application infrastructure 220 as it would be utilized in an application or processes executing on a computing device and accepting linguistic input from a user, such as the user 150. In particular, and as shown by the system 200 of FIG. 2, the linguistic input generated by the user 150 can initially be received by an input recognition component 211 appropriate for the linguistic input provided by the user 150. For example, if the linguistic input provided by the user 150 is a spoken input, then the input recognition component 211 can be a speech recognition component that can be capable of converting the audio information, representing the user's spoken input, into textual information. As another example, if the linguistic input provided by the user 150 was input via sign language, then the input recognition component 211 can be a sign language recognition component that can be capable of converting the image information, representing the user's sign language input, into textual information.

The textual information, representing the user's linguistic input, can be provided to a language understanding component 221. The language understanding component 221 can be capable of accepting such linguistic input, in a textual format, and, in conjunction with the dialog manager 222 and the knowledge source 223, derive meaning from the linguistic input, such as in the context of identifying appropriate, responsive processing to be performed. For example, if the user had spoken an instruction to display all of the available episodes of a given television show, the language understanding component 221, in conjunction with the dialog manager 222 and the knowledge source 223, can interpret such linguistic input to be a search-and-display-results request and that the name specified by the user is to be a search parameter and that it was a specification of a title. Similarly, as another example, if the user had asked for the extended forecast for a specific city, the language understanding component 221, in conjunction with the dialog manager 222 and the knowledge source 223, can interpret such linguistic input to be a factual request for meteorological information and that the name provided by the user is a name of a city that defines a geographic area for which the meteorological information was requested.

As indicated, the language understanding component 221, the dialog manager 222 and knowledge source 223 can represent a substantial investment of time and resources. More specifically, the language understanding component 221, the dialog manager 222 and the knowledge source 223 can have been built and refined through multiple iterations of receiving linguistic input from users and determining and undertaking responsive processing. Such multiple iterations can seek to correct aspects of the language understanding component 221, the dialog manager 222 and the knowledge source 223 that may have been sub-optimally implemented in prior iterations. For example, users may utilize different words and linguistic styles to ask for the same information, and the language understanding component 221, the dialog manager 222 and the knowledge source 223 can, through the various iterations and refinements, account for an increasing number of such different words and linguistic styles in order to be able to meaningfully respond to a greater breadth of users and a greater variety of input.

In one embodiment, the language understanding component 221, the dialog manager 222 and the knowledge source 223 can be further refined based on the specific context within which they are utilized. For example, an application providing access to entertainment content on a home entertainment computing device can receive linguistic input directed to such entertainment content and the language understanding component 221, the dialog manager 222 and the knowledge source 223 can be focused to take such context into account. Continuing with such an example, if a new television show is added whose name comprises words or terms not previously part of the existing application infrastructure 220, the infrastructure can be updated to include such words or terms, and their pronunciation and other delivery by a user so that, should a user request such a new television show, the existing application infrastructure will be able to cognize such a request. Similarly, as another example, an application providing personal assistant services on a smart phone computing device can receive linguistic input directed to a narrow set of actions typically performed by such personal assistance services and the language understanding components 221, the dialog manager 222 and the knowledge source 223 can be focused to take such context into account. Continuing with such another example, if one iteration of the existing application infrastructure 220 does not properly deduce, or efficiently process, requests to create text messages to specified users, subsequent iterations of the existing application infrastructure 220 can be updated to more easily recognize such requests based on the user's linguistic input and respond to them.

Once the language understanding components 221, the dialog manager 222 and the knowledge source 223 have initiated the performance of responses processing, output, to the extent any is appropriate, can be directed to a language generating component 224 that can, in concert with the dialog manager 222 and the knowledge source 223, provide output in a linguistic manner. The language generating component 224, like the language understanding components 221, the dialog manager 222 and the knowledge source 223, can also represent a substantial investment of time and resources and can have been generated as a result of multiple iterations seeking to improve user's perceptions of the linguistics utilized by the language generation component 224 in providing responsive output.

In one embodiment, the output provided by the language generation component 224 can be directed to an output production component 212 to be generated in a form that can be perceived by the user 150. For example, a text-to-speech component can be an output production component that can produce linguistic output in a spoken format. As will be recognized by those skilled in the art, other types of output production components can equally be utilized.

As indicated, the existing application infrastructure 220 can represent a substantial investment of time and resources. Unfortunately, the existing application infrastructure 220 is typically created within the context of a single language such as, for example, English. Consequently, a user providing linguistic input in another, different language, such as French, will not be able to utilize such an application. In one embodiment, however, rather than re-creating components analogous to those of the existing application infrastructure 220 in other languages, machine translation technology can be utilized to translate between such other languages and the anchor language within which context the existing application infrastructure 220 was initially created. The system 200 of FIG. 2 illustrates such a hybrid application, which can comprise the existing application infrastructure 220 in the anchor language and machine translation components that translate between a native language and the anchor language, thereby providing linguistic understanding functionality in one or more native languages while re-using the existing application infrastructure 220 in the anchor language and saving the time and expense of re-creating analogous infrastructure in those other, native languages.

Initially, the linguistic input provided by a user utilizing a native language different from the anchor language within which the existing application infrastructure 220 was created can be directed to a language identification component 230. For example, a foreign user 250 can provide input in a native language. Such input can be directed to the language identification component 230, which can utilize known techniques for identifying the language within which the linguistic input is being provided by the foreign user 250. Once the language of the linguistic input provided by the foreign user 250 is identified, the input can be directed to an appropriate one of the input recognition components 241, 261 and 271. For example, if the foreign user 250 provides linguistic input in French, the language identification component 230 can identify such linguistic input as being French and can direct it to the French input recognition component. Each of the input recognition components 241, 261 and 271 can perform analogous functions, with respect to the languages with which such input recognition components are associated, and in which context they operate. Such functions are also analogous to the input recognition component 211, whose operation was described in detail above.

Once the linguistic input provided by the foreign user 250 has been converted into a text-based linguistic input, in the language in which it was provided by the foreign user 250, the text-based linguistic input can be provided to a machine translation component to be translated into the anchor language, thereby enabling the existing application infrastructure 220 to be re-used. Depending on which of the input recognition components 241, 261 and 271 were selected, based upon the language identification performed by the language identification component 230, an appropriate machine translation component, from among the machine translation components 240, 260 and 270 can be provided with the text-based linguistic input generated by the selected one of the input recognition components 241, 261 and 271.

Once one of the machine translation components, such as the machine translation components 240, 260 and 270, has translated the linguistic input into the anchor language, that translated input can be provided to the language understanding component 221 in the same manner as described in detail above, since it is in the same anchor language as the inputs in the above descriptions. In addition, should the existing application infrastructure 220 generate output, such as via the language generation component 224, the machine translation component that provided the translated input to the language understanding component 221 can also receive the output generated by the language generation component 224 and can translate it back into the native language for presentation to the foreign user 250. More specifically, and as will be recognized by those skilled in the art, machine translation technology can be bi-directional, translating from one application to another, and vise-versa. Consequently, upon receiving output generated by the language generation component 224, the appropriate one of the machine translation components 240, 260 and 270 can translate, from the anchor language in which such output was provided by the language generation component 224 to the native language, namely that utilized by the foreign user 250 in order to provide the input in the first place.

Output translated by one of the machine translation components 240, 260 and 270, the output can be provided to a corresponding output production component 242, 262 and 272 that can operate in a manner analogous to the output production component 212 described in detail above. As will be recognized by those skilled in the art, if the output production component is nothing more than a very basic text-to-speech component, then there may be no need for output production components specific to specific languages. However, such very basic text-to-speech components may not be able to accurately verbalize certain aspects of linguistic output and may not be able to accommodate languages utilizing unique sounds. Consequently, the system 200 of FIG. 2 shows output production components 242, 262 and 272 that are language-specific, thereby enabling each output production component to be tailored to the reproduction of the language with which it is associated.

The system 200 of FIG. 2 illustrates an embodiment where a single collection of computer-executable instructions can accept input from foreign users speaking multiple different languages; a multi-lingual hybrid application. As an example, if the existing application infrastructure 220 was part of an English application or process, the system 200 of FIG. 2 illustrates an embodiment where the single collection of computer-executable instructions could, equally, accept input in French, Chinese, and Arabic. French input could be identified as such by the language identification component 230 and could be directed to, for example, the input recognition component 241 and, subsequently, the corresponding machine translation component 240, which can translate between French and the anchor language, namely English in the present example. Similarly, Chinese input could be identified as such by the language identification component 230 and could be directed to, continuing with the present example, the input recognition component 261 and, subsequently, the machine translation component 260, which can act to translate between Chinese and English. Arabic input could, likewise, be directed to, again, as an example, the input recognition component 271 and the machine translation component 270.

In another embodiment, however, each single application or process can be directed to only one specific language; a mono-lingual hybrid application. In such an embodiment, the language identification component 230 can be removed, as can all but one of the machine translation components and associated input recognition and output production components. For example, if an application were to be constructed for French speakers, utilizing the existing application infrastructure 220 that was constructed for English speakers, such an application could comprise a single input recognition component, which could accept the French input and convert it into text-based linguistic input, in French, and a single machine translation component that could translate that text-based linguistic input, in French, into text-based linguistic input in English to be provided to the language understanding component 221. Similarly, the single machine translation component could translate English output, to the extent that any was produced by the existing application infrastructure 220, into French and provide that translated French output to a single French output production component. In such a manner, the complexity and size of an application or process could be reduced, but each such mono-lingual application or process could only operate in the context of one language.

As will be recognized by those skilled in the art, machine translation components, such as those illustrated in the system 200 of FIG. 2, are well known in the art and are the subject of continuing research and improvement. Nevertheless, in one embodiment, it is contemplated that the machine translation components utilized, such as in the manner described in detail above, can be tweaked to provide greater accuracy within the specific context of the application or process. For example, an application that is designed to provide users with access to entertainment content, such as would be executed on a home entertainment computing device, can comprise a machine translation component that can be modified to include verbiage relevance to entertainment applications that may not be part of an off-the-shelf machine translation component and which may continually evolve, such as the terminology utilized by new television shows or movies. Similarly, the language understanding component 221, the dialog manager 222, the knowledge source 223 and the language generation component 224 can, likewise, be modified to accommodate specific issues that may arise with the introduction of the machine translation components. For example, certain words, terms or phrases in the anchor language may be translated more accurately by the machine translation components than other words, terms or phrases that would be synonyms in the relevant language. In such a case, those words, terms and phrases can receive preferential treatment by the existing application infrastructure 220.

Figure 3:
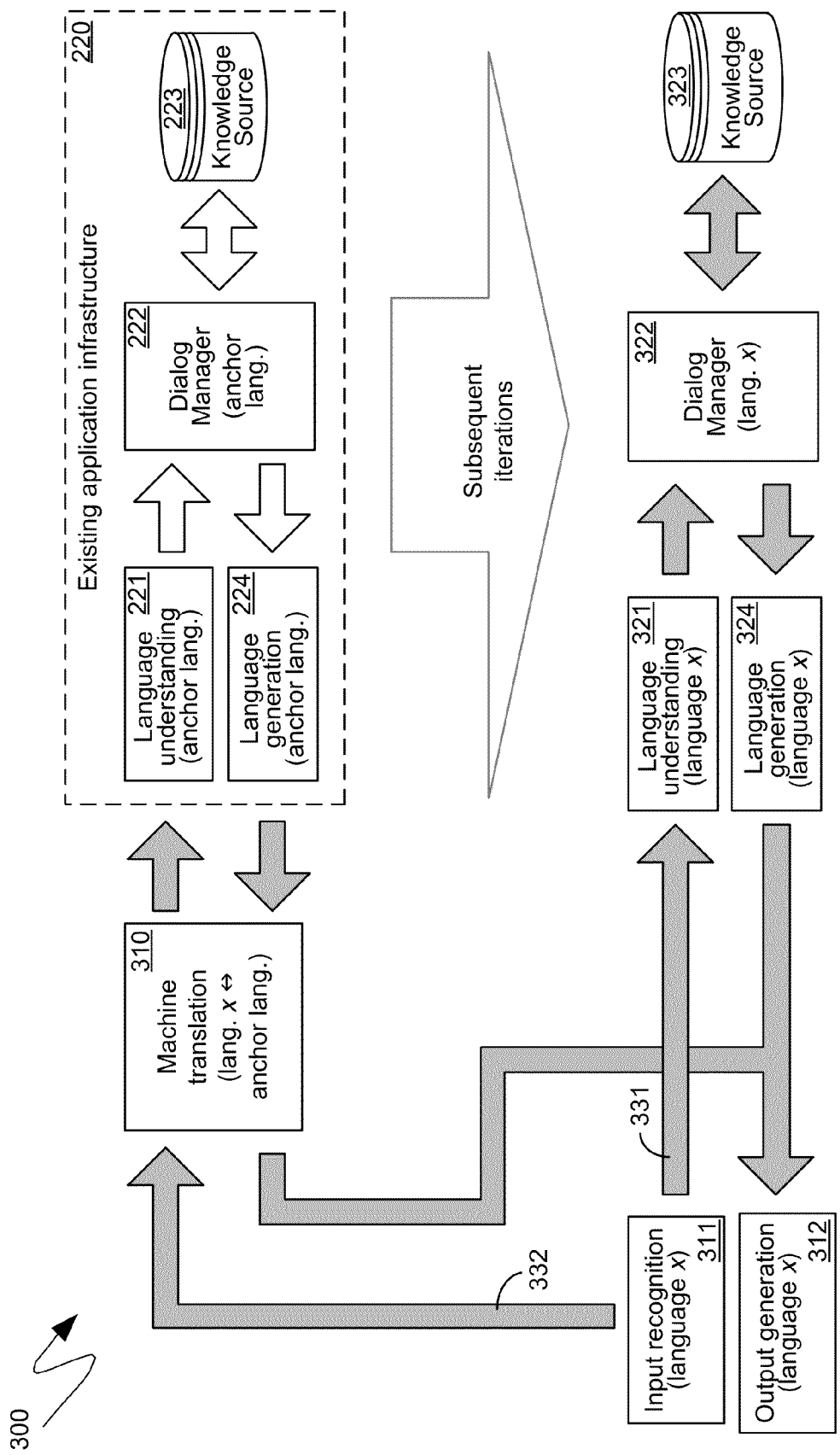
FIG. 3 is a block diagram of an exemplary conversion of a hybrid process into a native language process.

In one embodiment, the hybrid application illustrated by the system 200 of FIG. 2, wherein machine translation components are utilized to translate between a native language and an anchor language, thereby facilitating reutilization of existing application infrastructure in the anchor language, can be utilized as a starting point from which to generate a single-language application or process in a native language that differs from the anchor language. Turning to FIG. 3, the system 300 shown therein illustrates an exemplary creation of a non-hybrid single-language application or process from a hybrid application or process. Initially, as illustrated by the system 300 of FIG. 3, input can be received by an input recognition component 311 in the native language, and can then be provided to the machine translation component 310 to be translated into the anchor language for provision to the existing application infrastructure 220, such as in the manner described in detail above.

As indicated previously, for certain terms, words, phrases, and other linguistic components of a user's input, the machine translation component 310, the existing application infrastructure 220, or some combination thereof can be modified to more accurately interpret and respond to those linguistic components. In one embodiment, rather than modifying the machine translation component 310, or the existing application infrastructure 220, to account for such improvements, a new language understanding component 321 in the native language, a new dialog manager 322, again in the native language, a new knowledge source 323 and a new language generation 324 can be created to address such modifications and improvements. Over time, through subsequent iterations, the language understanding component 321, dialog manager 322, knowledge source 323 and language generation component 324 can be continually improved and expanded to ultimately be able to operate without resorting to the existing application infrastructure 220. In such a case, the machine translation component 310 will, likewise, no longer be required and, consequently, a new application or process for the native language can cease being a hybrid, such as those described in detail above. Instead, such a new application or process for the native language can comprise the input recognition component 310, language understanding component 321, dialog manager 322, knowledge source 323, language generation component 324 and output generation component 312, all of which can operate directly in the native language. In such a manner, the hybrid application or process that reused the existing application infrastructure 220 can have acted as a stopgap measure, or a temporary construct from which a non-hybrid single language application or process could be generated through subsequent iterations during which single language components in the native language were developed and refined based upon real-world utilization and feedback.

Figure 4:
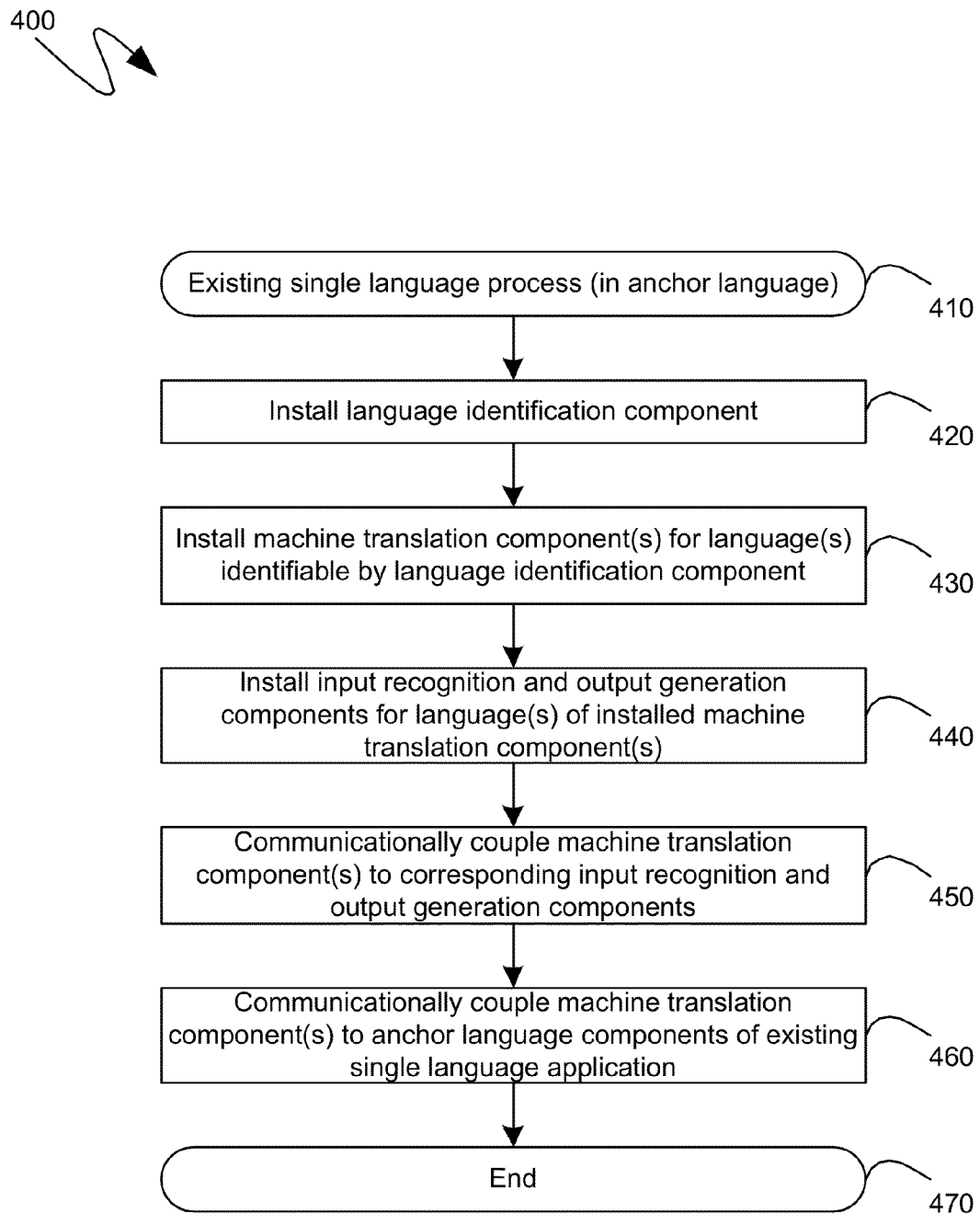
FIG. 4 is a flow diagram of an exemplary creation of a hybrid process comprising linguistic components associated with an anchor language and machine translation components for translating between the anchor language and other languages.

Turning to FIG. 4, the flow diagram 400 shown therein illustrates an exemplary series of steps by which linguistic components of an existing application in an anchor language can be re-utilized to provide linguistic functionality in one or more native languages that differ from the anchor language. For example, in one embodiment, the exemplary steps of the flow diagram 400 shown in FIG. 4 can be performed by a service that can be offered to application or process developers to enable them to efficiently create a version of their application or process that can accept linguistic input from one or more native languages that differ from the anchor language in which those developers initially created their application or process. As shown, at step 410, an existing single language process or application in an anchor language can be utilized as a starting point, such as an input that is to be provided to the service. Subsequently, at step 420, upon receiving, or having access to, the existing single language process from step 410, a language identification component can be installed that can accept input in languages other than the anchor language and which can identify such languages in which the input is provided and select appropriate machine translation components. As indicated previously, in one embodiment, if the hybrid application or process to be created is to accept input of only a single language, other than the anchor language, then step 420 can be optional, since only one machine translation component can be utilized, namely a machine translation component for translating between the anchor language and the single other language to which the hybrid application or process will be directed.

At step 430 one or more machine translation components can be installed that can translate between the anchor language, within which context the single language process from step 410 was created, and one or more native languages, differing from the anchor language, in which input can be accepted and output can, optionally, be provided. If multiple machine translation components are installed at step 430, the machine translation components installed at step 430 can translate between the anchor language and those native languages that can be identified by the language identification component that was installed at step 420.

Subsequently, at step 440, input recognition and output generation components corresponding to the machine translation components installed at step 430 can be installed. As indicated previously, input recognition components can accept linguistic input in a variety of forms, such as the audio of spoken linguistic input, and can recognize such forms and convert them into text-based linguistic input. Such text-based linguistic input can, then, be provided to further processes such as, for example, the machine translation components. As also indicated previously, input recognition components, such as those installed at step 440, can be language specific in that an input recognition component designed to recognize linguistic input in one language will only be able to accurately recognize such linguistic input in that one language. Consequently, the input recognition components installed at step 440 can correspond to the machine translation components installed at step 430 as far as the languages within the context of which such components operate. Thus, if machine translation components for a specific set of languages were installed at step 430, then, at step 440, input recognition components for those same languages can be installed.

As also indicated previously, output generation components can accept text-based linguistic output and can generate that output in a manner that can be accepted by the user such as, for example, by speaking the linguistic output. While it is possible that output generation components can be language neutral, such output generation components can be sub-optimal. Consequently, in one embodiment, it is contemplated that, at step 440, language-specific output generation components can be installed that correspond to the languages of the input recognition components that were also installed at step 440.

Subsequently, at step 450, the machine translation components that were installed at step 430 can be communicationally coupled with the input recognition and output generation components that were installed at step 440 in such a manner that the input recognition component accepting linguistic input in a particular language is communicationally coupled with a machine translation component that can translate between such a language and the anchor language, and in such a manner that the output generation component generating linguistic output in a particular language is communicationally coupled with the machine translation component that can translate between that language and the anchor language. At step 460 the machine translation components that were installed at step 430 can be communicationally coupled with the linguistic components of the existing single language process or application of step 410. In particular, the machine translation components that were installed at step 430 can provide, to such linguistic components of the existing single language process or application, linguistic input that was translated from a native language in which such linguistic input was provided into the anchor language. Similarly in machine translation components that were installed at step 430 can, optionally, receive, from such linguistic components of the existing single language application or process, linguistic output in the anchor language, which the machine translation components can then translate into the native language.

As illustrated by the system 200 of FIG. 2, the installation and communicational coupling performed by steps 420 through 460 can transform an existing single language application or process, such as that input at step 410, into a hybrid application or process that can accept input from one or more native languages that differ from the anchor language, and can, optionally, provide output in those same native languages. Consequently, the relevant processing of the flow diagram 400 shown in FIG. 4 can end at step 470.

Figure 5:
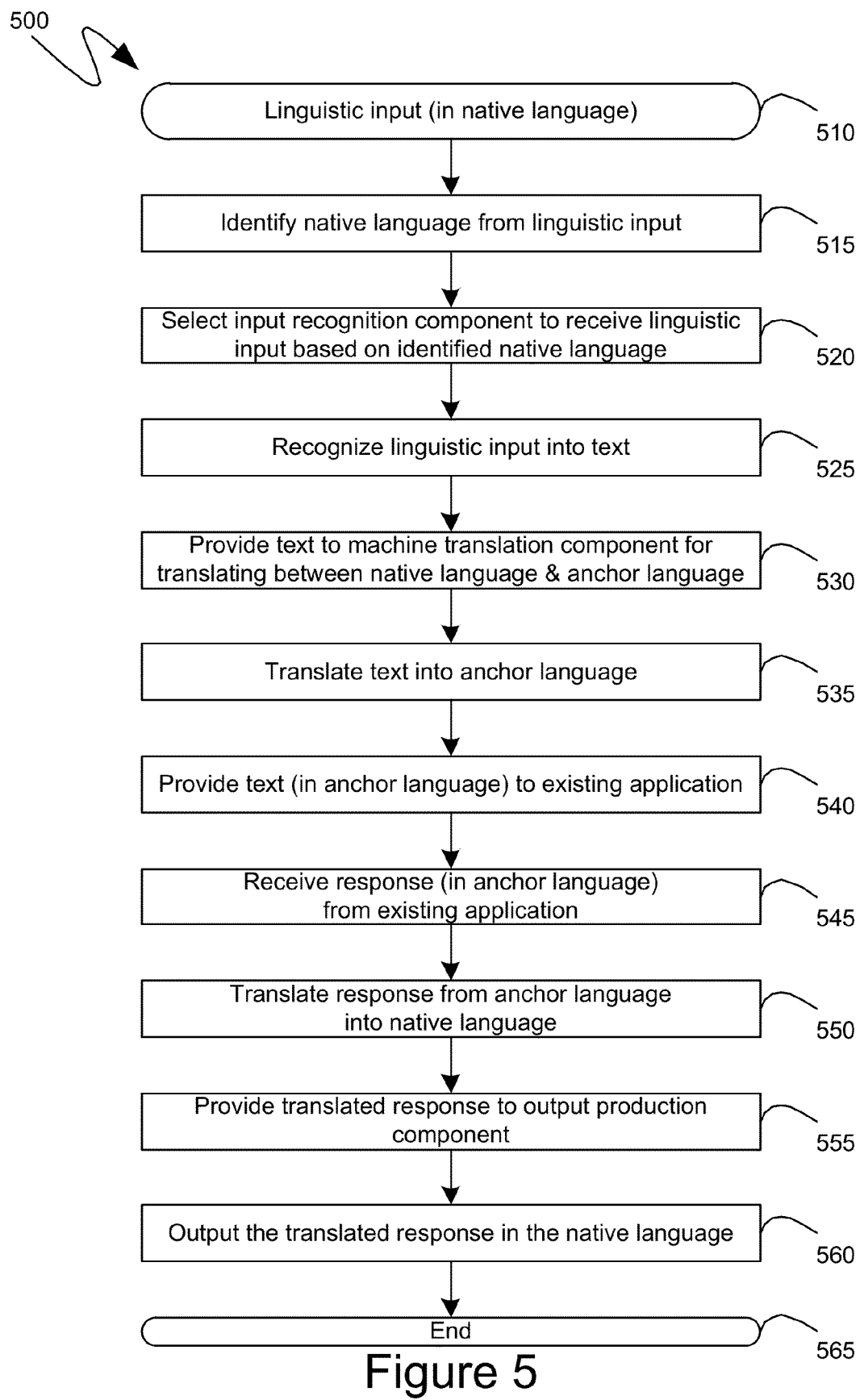
FIG. 5 is a flow diagram of an exemplary operation of a hybrid process comprising linguistic components associated with an anchor language and machine translation components for translating between the anchor language and other languages.

Turning to FIG. 5, the flow diagram 500 shown therein can illustrate exemplary series of steps that can be performed by a hybrid application or process, which can accept input and, optionally, provide output in one or more native languages while re-using linguistic components in an anchor language differing from those native languages. Initially, at step 510, as shown, a linguistic input can be received in a native language. Subsequently, at step 515, the native language in which the linguistic input was received, at step 510, can be identified. That identification can then be utilized, at step 520, to select an input recognition component to which the linguistic input that was received at step 510 can be directed. In particular, the input recognition component selected at step 520 can be the input recognition component designed to recognize input in the native language, as identified at step 550. At step 525, then, the selected input recognition component can recognize the linguistic input from step 510 and convert it into text-based linguistic input.

At step 530, the text-based linguistic input can be provided to a machine translation component that is capable of translating between the native language, as identified at step 515, of the linguistic input that was received at step 510, and the anchor language. At step 535 the machine translation component can translate the text based linguistic input from the native language in which such linguistic input was initially provided, into the anchor language. Subsequently, at step 540, the translated text, which is now in the anchor language, can be provided to the linguistic components of an existing application or process that was originally generated in the anchor language. Those existing linguistic components, which can, as indicated previously, represent substantial investment of time and resources, can then process the input, which was provided in the anchor language at step 540, and can generate an appropriate response.

At step 545, the response from the existing linguistic components can be received in the anchor language and can be translated, at step 550, from the anchor language into the native language in which the linguistic input was received at step 510. At step 555, the translated response can be provided to an output production component associated with the native language. For example, as indicated previously, such an output production component can be a text-to-speech component that can verbalize the translated response. As will be recognized by those skilled in the art, such a text-to-speech component can be language specific in order to capture the nuances of a particular spoken language and provide more accurate output for the user to receive. Thus, at step 555, the output production component that can be selected can be the output production component that provides output in the needed language in which the linguistic input, received at step 510, was received. At step 560, the output can be generated by the output production component and provided to the user. The relevant processing can then end at step 565.

Figure 6:
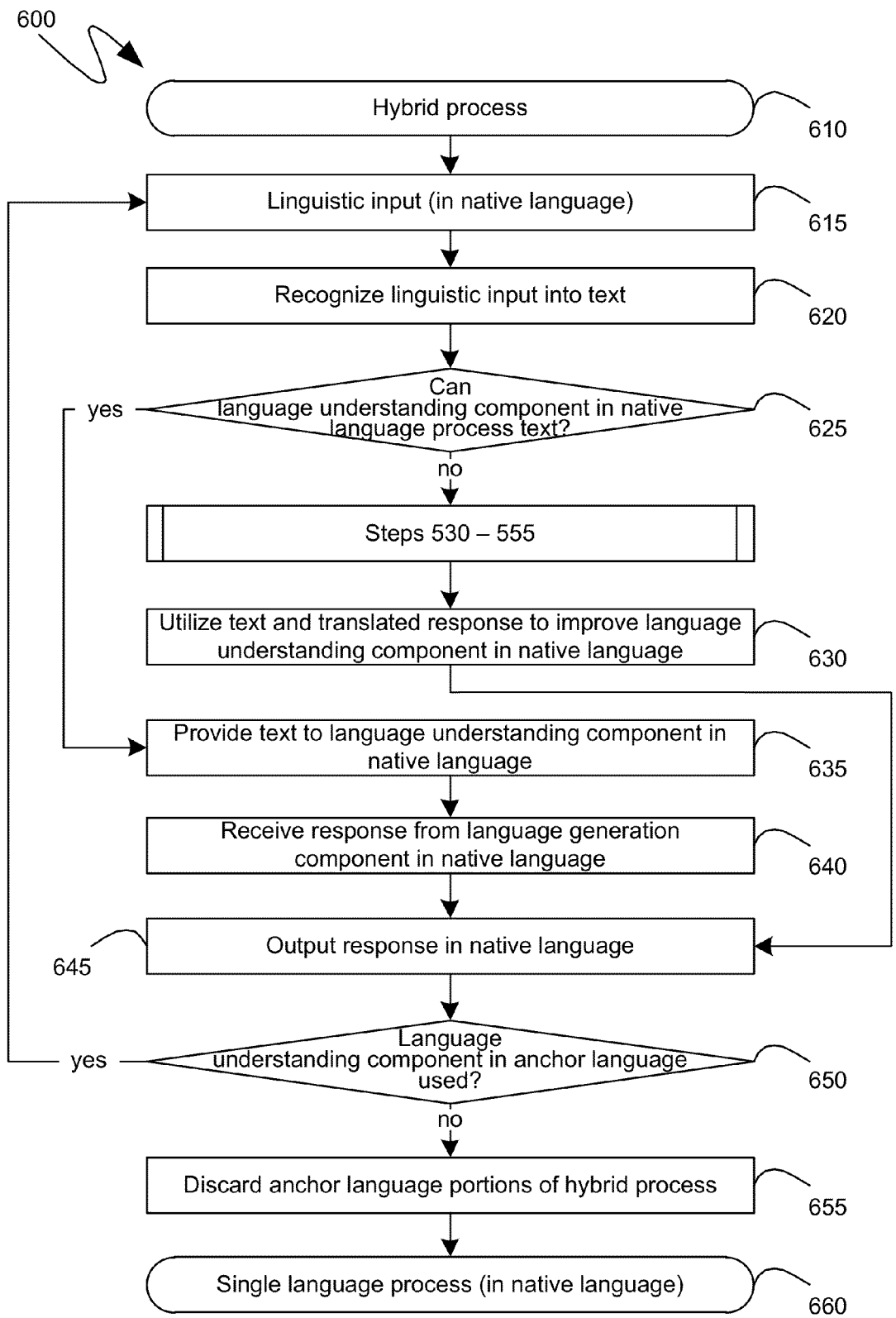
FIG. 6 is a flow diagram of an exemplary conversion of a hybrid process into a native-language process.

Turning to FIG. 6, the flow diagram 600 shown therein illustrates one exemplary series of steps that can be performed to create a single-language process that can accept input and, optionally, provide output in a native language, which such a single-language process can be created from a hybrid process that is re-using existing linguistic components that were originally created in an anchor language, together with machine translation components to translate between the anchor language and the native language. Initially, at step 610, such a hybrid process can have already been created such as, for example, by the steps of the flow diagram 400 of FIG. 4. Subsequently, as part of the execution of the hybrid process, linguistic input in a native language can be received, such as at step 650. At step 620, the hybrid process can recognize the linguistic input and convert it into text-based linguistic input, such as in the manner described in detail above.

At step 625, a determination can be made whether a language understanding component in the native language can adequately process the text-based linguistic input generated at step 620. If such a language understanding component operating in the native language cannot adequately process such linguistic input, processing can proceed to steps 530 through 555, which were described in detail above. Subsequently, after the performance of steps 530 through 555, processing can return to step 630 where information regarding the received linguistic input into the processing that was performed by steps 530 through 555 can be utilized to improve the language understanding component, dialog manager, and other like linguistic components that are implemented in the native language. Processing can then proceed with step 645 where the response that was generated by steps 530 through 555 can be presented, or output, to the user in the native language.

If, however, at step 625, it is determined that the language processing component in the native language can appropriately process the linguistic input, processing can, instead, proceed to step 635 where the text-based linguistic input can be provided to the language understanding component in the native language, without requiring any machine translation between the native language and an anchor language. Subsequently, at step 640, a response can be received from a language generation component that, like the language understanding component, operates within the context of the native language. At step 645, as indicated previously, such a native language response can be output to the user. In one embodiment, at step 650, a check can be made as to whether the existing linguistic components in the anchor language that were being re-utilized by the hybrid process are still, in fact, being utilized. If, at step 650, it is determined that such anchor language linguistic components are still being utilized, then processing can return to step 615 to receive further linguistic input. However, if it is determined, at step 650, that the linguistic components that operate within the context of the anchor language are no longer being utilized, then, in one embodiment, at step 655, those linguistic components can be discarded from the hybrid application or process, leaving only a single language application or process that operates within the context of the native language, as illustrated at step 660.

As can be seen from the above descriptions, mechanisms for re-using existing linguistic components to process linguistic input and, optionally, output of languages other than the language in which context such existing linguistic components operate by utilizing machine translation components to translate between such languages and the language of the existing components have been presented. In view of the many possible variations of the subject matter described herein, we claim as our invention all such embodiments as may come within the scope of the following claims and equivalents thereto.

We claim:

1. One or more computer-readable storage media comprising computer-executable instructions for providing linguistic services, the computer-executable instructions directed to steps comprising:
receiving linguistic input in a first language from a user;
generating a text-based linguistic input in the first language by recognizing the received linguistic input;
utilizing machine translation to translate the text-based linguistic input from the first language into a second language differing from the first language;
providing the translated text-based linguistic input, in the second language, to pre-existing components providing linguistic services that operate in the context of the second language;
receiving, from the pre-existing components, output that is responsive to the linguistic input, the output being provided in the second language;
utilizing the machine translation to translate the output in the second language into the first language;
generating output that is receivable by the user in accordance with the translated output in the first language.

2. The computer-readable storage media of claim 1, wherein the linguistic input is input by the user by being spoken by the user in the first language.

3. The computer-readable storage media of claim 1, wherein the computer-executable instructions for generating the output that is receivable by the user comprise text-to-speech computer-executable instructions.

4. The computer-readable storage media of claim 1, comprising further computer-executable instructions directed to: identifying the first language from the received linguistic input; and selecting an input recognition component to perform the generating the text-based linguistic input and a machine translation component based on the identified first language.

5. The computer-readable storage media of claim 4, further comprises at least two machine translation components, at least one of which is utilized to translate the text-based linguistic input from the first language into the second language.

6. The computer-readable storage media of claim 1, further comprising components providing linguistic services that operate in the context of the first language and that are analogous to the components providing linguistic services that operate in the context of the second language.

7. The computer-readable storage media of claim 6, wherein the components providing linguistic services that operate in the context of the second language and the machine translation acted as a starting point for the generation of the components providing linguistic services that operate in the context of the first language.

8. The computer-readable storage media of claim 1, wherein the machine translation is modified to account for linguistic elements specific to a functionality provided by the computer-executable instructions.

9. The computer-readable storage media of claim 1, wherein the pre-existing components are modified to account for linguistic elements specific to a functionality provided by the computer-executable instructions.

10. One or more computer-readable storage media comprising computer-executable instructions for modifying an already existing process, which provides linguistic services in a first language, to provide linguistic services in at least a second language that is different from the first language, the computer-executable instructions directed to steps comprising:
obtaining pre-existing components, of the already existing process, which provide linguistic services in the first language;
communicationally coupling, to the pre-existing components, a machine translation component that translates between the first language and the second language, the communicational coupling between the pre-existing components and the machine transaction component providing for a text-based input received in the second language to be translated into the first language by the machine translation component and then provided to the pre-existing components, and for output generated by the pre-existing components in the first language to be received by the machine translation component and translated into the second language;
communicationally coupling an input recognition component to the machine translation component to provide for input received in the second language to be recognized by the input recognition component into the text-based input and provided to the machine translation component; and
communicationally coupling an output generation component to the machine translation component to provide for translated output in the second language to be provided, by the machine translation component, to the output generation component and output to a user, who provided the input, in a manner receivable by the user.

11. The computer-readable storage media of claim 10, wherein the input received in the second language is a spoken input, spoken using the second language.

12. The computer-readable storage media of claim 10, wherein the output generation component is a text-to-speech component.

13. The computer-readable storage media of claim 10, comprising further computer-executable instructions for: communicationally coupling a language identification component to the input recognition component, the language identification component receiving the input in the second language, identifying a language in which the input is provided, and directing the input to the input recognition component if the language in which the input is provided is identified as the second language.

14. The computer-readable storage media of claim 13, comprising further computer-executable instructions for:
communicationally coupling, to the pre-existing components, a second machine translation component that translates between the first language and a third language;
communicationally coupling a second input recognition component to the second machine translation component; and communicationally coupling the language identification component to the second input recognition component, the language identification component directing the input to the second input recognition component if the language in which the input is provided is identified as the third language.

15. The computer-readable storage media of claim 10, comprising further computer-executable instructions for modifying the machine translation component to account for linguistic elements specific to a functionality provided by the already existing process.

16. The computer-readable storage media of claim 10, comprising further computer-executable instructions for modifying the pre-existing components to account for linguistic elements specific to a functionality provided by the already existing process.

17. A method of generating a process that provides linguistic services in a first application from an already existing process that provides the services in a second language that is different from the first language, the method comprising the steps of:
   generating a hybrid process to act as a starting point, the hybrid process comprising: pre-existing components, of the already existing process, which provide linguistic services in the second language, a machine translation component that translates between the first language and the second language, an input recognition component that recognizes linguistic input received in the first language into text-based linguistic input, and an output generation component that generates output, in a manner receivable by the user, in the first language;
   generating components providing linguistic services in the first language that are analogous to pre-existing components which provide linguistic services in the second language;
   improving the generated components that provide the linguistic services in the first language based on received input and responsive processing performed by the generated hybrid process; and
   replacing the pre-existing components and the machine translation component with the generated and improved components that provide the linguistic services in the first language.

18. The method of claim 17, wherein the hybrid process further comprises a language identification component that identifies a language within which input to the hybrid process is provided.

19. The method of claim 17, wherein the improving the generated components that provide linguistic services in the first language comprises incorporating, into the generated components, new linguistic elements arising within a context of a functionality provided by the process being generated.

20. The method of claim 17, wherein the linguistic services provided by the process being generated comprise responding to spoken input that is spoken in the first language.

21. A system for providing linguistic services, the system comprising:
   pre-existing components providing linguistic services that operate in the context of a second language, the pre-existing components being provided linguistic input, in the second language, and, in response, generating output that is responsive to the linguistic input, the output being provided in the second language;
   an input recognition component receiving linguistic input in a first language from a user and generating a text-based linguistic input in the first language by recognizing the received linguistic input, the first language differing from the second language;
   a machine translation component translating the text-based linguistic input, generated by the input recognition component, from the first language into the second language, and further translating the output, generated by the pre-existing components, and provided in the second language, into the first language; and
   an output generation component generating output that is receivable by the user in accordance with the translated output in the first language from the machine translation component.

22. The system of claim 21, further comprising a language identification component receiving the linguistic input in the first language, identifying a language in which the linguistic input is provided, and directing the linguistic input to the input recognition component if the language in which the linguistic input is provided is identified as the first language.

23. The system of claim 22, further comprising:
   a second input recognition component, the second input recognition component receiving the linguistic input in a third language and generating a text-based linguistic input in the third language by recognizing the received linguistic input in the third language, the third language differing from both the first and second languages;
   a second machine translation component translating the text-based linguistic input in the third language, generated by the second input recognition component, from the third language into the second language, and further translating the output, generated by the pre-existing components, and provided in the second language, into the third language; and
   a second output generation component generating output that is receivable by the user in accordance with the translated output in the third language from the second machine translation component;
   wherein the language identification component directs linguistic input in the third language to the second input recognition component if the language in which the linguistic input in the third language is provided is identified as the third language by the language identification component.

24. The system of claim 21, further comprising components providing linguistic services that operate in the context of the first language and that are analogous to the pre-existing components providing linguistic services that operate in the context of a second language; wherein the pre-existing components providing linguistic services that operate in the context of the second language and the machine translation component acted as a starting point for the generation of the components providing linguistic services that operate in the context of the first language.

* * * * *